United States Patent [19]

Vincent et al.

[11] Patent Number: 4,853,264
[45] Date of Patent: Aug. 1, 1989

[54] CURVED TRIPLE-PANE GLAZING

[75] Inventors: Steve M. Vincent, Union City; Gerald R. Behling, Sunnyvale; Thomas G. Hood, San Francisco; William E. Gomm, Stockton, all of Calif.

[73] Assignee: Southwall Technologies, Palo Alto, Calif.

[21] Appl. No.: 143,728

[22] Filed: Jan. 14, 1988

[51] Int. Cl.⁴ .......................... E06B 3/24; E06B 7/12; E04C 2/54
[52] U.S. Cl. ...................... 428/34; 428/192; 428/213; 428/412; 428/430; 428/432; 428/433; 428/457; 428/458; 428/469; 428/480; 428/913; 156/99; 156/102; 156/107; 156/109; 52/171; 52/789; 52/790
[58] Field of Search ............... 428/34, 412, 430, 483, 428/480, 432, 433, 469, 263, 265, 192, 119, 913, 457, 458, 38; 52/172, 171, 788, 789, 790; 156/108, 109, 107, 99, 102, 160, 166, 196, 292

[56] References Cited

U.S. PATENT DOCUMENTS

| | | |
|---|---|---|
| 3,758,996 | 9/1973 | Bowser ................................. 52/172 |
| 3,837,129 | 9/1974 | Losell ................................. 428/34 |
| 4,215,164 | 7/1980 | Bowser ................................. 428/34 |
| 4,335,166 | 6/1982 | Lizardo et al. . |
| 4,337,990 | 7/1982 | Fan et al. . |
| 4,510,190 | 4/1985 | Gläser ................................. 428/34 |
| 4,520,611 | 6/1985 | Shingu et al. ........................ 52/790 |
| 4,536,424 | 8/1985 | Laurent ............................... 428/34 |
| 4,565,719 | 1/1986 | Phillips et al. ....................... 428/34 |

FOREIGN PATENT DOCUMENTS

| | | | |
|---|---|---|---|
| 0109481 | 6/1985 | Japan ................................. 428/34 |
| 2144476 | 8/1983 | United Kingdom .................. 428/34 |

Primary Examiner—Ellis P. Robinson
Assistant Examiner—Donald J. Loney
Attorney, Agent, or Firm—Irell & Manella

[57] ABSTRACT

Curved, insulated glazing structures and their preparation are disclosed. The glazing structures comprise two rigid outer surfaces (generally glass) and a suspended inner film surface parallel to the outer surfaces. The inner film is adhered to the outer surfaces only on its curved edges—its straight edges being unattached. The inner film is generally heat shrunk in the direction parallel to the straight edges and preferably carries a heat reflective coating.

15 Claims, 1 Drawing Sheet

CURVED TRIPLE-PANE GLAZING

BACKGROUND OF THE INVENTION

1. Field of the Invention

This invention relates to insulated glazing materials. More particularly, it relates to curved panel insulated glazing materials for use in architectural windows.

2. Description of Prior Art

In recent years, there has been increasing emphasis on the use of multipane insulating glazings in architectural structures. Government regulations have mandated the use of double- and triple-pane glazings. Energy costs have made the increased cost of these constructions a wise investment. Another trend in recent years has been an esthetic one. This has been the incorporation of curved window surfaces into building structures. Common applications for these curved structures have been greenhouse structures, arched entrances, and arched roofs over patios, walks, and the like. Very commonly, these curved panels make up a part of a large surface area glass structure. This makes it very important from an energy and comfort point of view to have the curved areas present multipane insulating properties. Without such properties, the heat loads presented can be huge. The conventional way to provide insulated windows has been to employ two or three parallel panes of glass, the faces of which are in spaced relationship, thereby providing between the glass panes one or two dead air spaces which impart insulating properties to the structure. In the most common arrangement, two parallel panes of glass are held in spaced relationship by metallic or plastic spacers or fasteners positioned around the perimeters of the panes. When a triple-pane glazing is desired, one approach has been to use three parallel sheets of glass. This structure can be extremely heavy.

Over the past few years, Southwall Technologies Inc., the assignee of the present invention, has promoted a triple-glazing structure which employs two glass panes with an intermediate plastic film. Such products are described, for example, in U.S. Pat. No. 4,335,166 of Lazardo et al. To achieve even better results, the internal plastic film can be coated with a heat-reflective layer, such as a dielectric/metal/dielectric interference filter of the general type described in U.S. Pat. No. 4,337,990 of Fan et al.

In these glass/plastic film/glass triple-pane structures, the plastic film is stretched taut. It is essential that there be no wrinkles or major discontinuities in the film. If such defects are present, the center film becomes an obtrusive interference in the window's visual properties. With flat-panel windows, a substantial body of technology has arisen to tension the internal film either by heat shrinking or by the use of mechanical tensioning devices. While these methods have proven suitable for flat panels, their use in curved panels has led to problems. For one, as the film is shrunk or tensioned in curved panels, using conventional flat-panel technology, in which the film is affixed to the full perimeter of the frame, the parallel relationship between the plastic film and the two glass panes is disturbed. This leads, at minimum, to visual distortion in the final product, and can in extreme cases lead to the film's contacting one of the glass panes so as to produce a major visual interruption.

It is the general object of this invention to provide an improved curved triple-glazing structure having as its middle glazing a plastic sheet. It is also an object of this invention to provide a method for producing such triple-pane glazings.

STATEMENT OF THE INVENTION

We have now discovered an improved structure for curved multipane insulating glazing materials. Our new structure comprises a first rigid glazing panel which is curved, that is, it has a perimeter defined by two op-posite parallel curved edges and two opposite parallel straight edges;

an intermediate flexible plastic glazing panel, similar in size and shape to the first rigid panel. This intermediate flexible sheet is spaced from and parallel to the first rigid glazing panel; and a second rigid glazing panel similar in size, shape and perimeter to the first rigid glazing panel. This second rigid panel is spaced from and parallel to the first rigid panel and the intermediate flexible panel. In our structure the first and second rigid panels are joined to one another in their spaced parallel relationship on substantially their entire perimeter using metal or plastic spacers and various joining means. The flexible panel is joined into the structure only on its parallel curved edges. That is, the flexible panel is free or unattached on its parallel straight edges.

In preferred aspects, the first and second rigid panels are made of glass. In other preferred aspects, the intermediate flexible panel is made of a substantially unidirectionally heat-shrinkable plastic, with the predominant direction of shrinkage being parallel to the parallel straight (uncurved) edges. This heat shrink is of advantage to lightly tension the film and also to overcome difference in thermal expansion and retain optimal properties. In other preferred aspects, the flexible plastic sheet carries a heat-reflecting layer. This heat-reflecting layer can, advantageously, be a dielectric/metal/dielectric interference filter.

In another aspect, the present invention provides a method for fabricating these curved insulating glazing structures wherein the middle layer is a heat-shrunk plastic. In this method, the three glazing layers are first assembled into their parallel-spaced relationship with the intermediate flexible layer being joined only on it curved edges, and thereafter the assembled structure is subjected to heat treatment for a time and intensity adequate to preferentially heat shrink the intermediate layer in the direction parallel to the parallel straight edges of the glazing structure.

DETAILED DESCRIPTION OF THE INVENTION

Brief Description of the Drawings

The glazing structures of this invention and their preparation will be further described with reference being made to the accompanying drawings, in which.

DESCRIPTION OF THE PREFERRED EMBODIMENTS

The curved glazing structures of this invention include two parallel curved rigid sheets spaced apart from one another with a third flexible sheet suspended in between them.

The two rigid sheets can be a rigid plastic material, such as a rigid acrylic or polycarbonate, but most commonly are glass. In most of the architectural applications of the present invention, this glass serves partially as an overhead glass. For safety reasons, such glass generally is tempered or annealed. Laminated glass can be used. Any conventional thicknesses of glass may be used, if desired. Most commonly, ⅛-inch or 3/16-inch float glass is employed. Such curved glass panels are readily available commercially. They are sold in various curve radiuses such that the two panels can be parallel when spaced apart from one another.

Depending upon architectural preference, one or both of the glass panels may be coated, tinted, or pigmented. This may be done to enhance appearance, to alter light-transmission properties, or to promote heat rejection. Bronze, copper, or gray tints are often applied to the outer of the two glass panels.

The third, or intermediate, sheet in the triple glazing is a flexible plastic sheet. This plastic should be selected to have good light stability so as to withstand the rigors of prolonged sun exposure. This plastic should also have the properties of not being substantially susceptible to outgassing, such as may occur with large monomer or plasticizer contents, as this outgassing could lead to deposits on the inner surfaces of the glass layers and interfere with optical clarity. Polycarbonate materials and the like can be used, but there is a preference for the polyesters, such as poly(ethylene terphthalate). This intermediate plastic film is relatively thick, compared to other window-film materials. Thicknesses above about 3 mils (0.003 inches) are generally used, with thicknesses in the range of from about 5 mils to about 25 mils being preferred and thicknesses in the range of about 5 mils to 15 mils being more preferred. We have had excellent results with 6 to 10 mil polyester as an intermediate layer. Toray is a well-known commercial source for suitable films.

Figure 1:
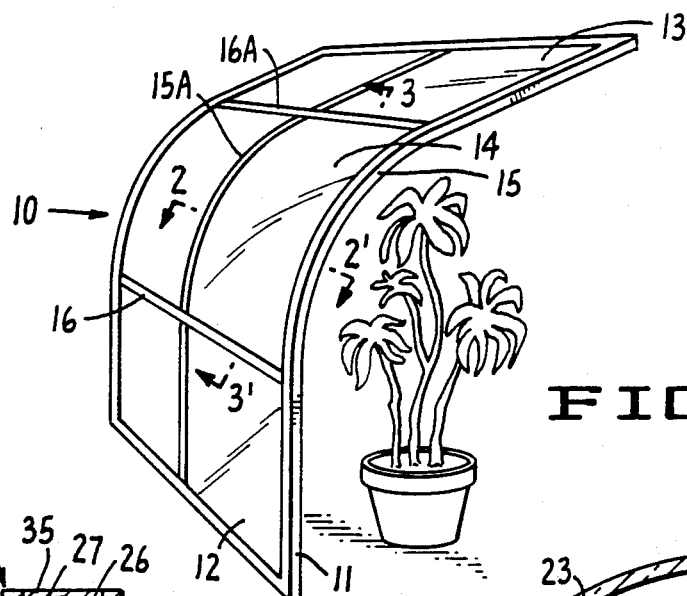
FIG. 1 is a perspective illustration showing a curved glazing structure of this invention in use in a greenhouse.

The three layers are assembled into a curved glazing structure. Turning to FIG. 1, a greenhouse structure 10 is shown. It includes frame members 11, flat wall window unit 12, flat roof window unit 13, and curved structure of this invention 14. Structure 14 includes two curved sides 15 and 15A and two flat sides 16 and 16A. The two curved sides are parallel to one another; the two flat sides are parallel to one another.

Figures 2, 3:
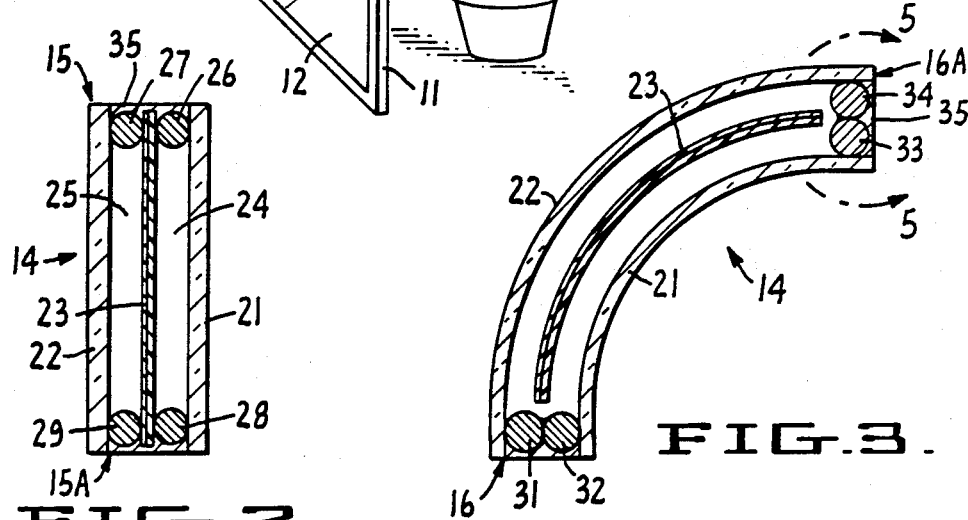
FIG. 2 is a cross-sectional view of a curved glazing structure of this invention taken parallel to the straight sides of the structure.
FIG. 3 likewise is a cross-section of a glazing panel of this invention but taken parallel to the curved side of the structure.
Figure 5:
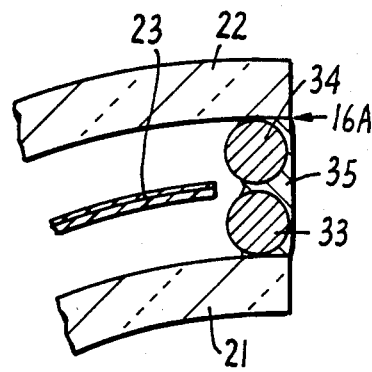
FIG. 5 is an expanded-scale view of the junction of the three panels of the glazing structure at the end of the curved surface.

Turning to FIG. 2, a cross-section taken along lines 2—2' in FIG. 1, it can be seen that structure 14 includes two rigid panels 21 and 22 and flexible panel 23. Panel 23 has a heat-reflective layer on its outer side, that is the side facing out of the building. This layer will be described with reference to FIG. 6. Panels 21, 22 and 23 are spaced apart from one another with voids 24 and 25 resulting. These voids are created by spacers 26, 27, 28 and 29. These spacers also grip and adhere intermediate layer 23 into the structure along curved edges 15 and 15A. In contrast, as shown in FIG. 3, a cross-section taken along lines 3—3, in FIG. 1, intermediate layer 23 is not affixed to rigid layers 21 and 22 at the edges parallel to straight sides 16 and 16A. At these edges, spacers 31, 32, 33 and 34 serve to join the outer rigid layers. This feature is shown in better detail in FIG. 5, wherein the gap between the edge of layer 23 and spacers 34 and 35 is shown clearly.

The spacers, such as 26, 27, 28, 29, 31, 32, 33 and 34 are illustrated as individual components. In actual practice they can be assembled into curved rectangular open frames. Typical spacer materials are plastic extrudates and aluminum and steel extruded and roll-formed channels. The above-noted Lazardo et al. patent describes one common type of spacer unit and is incorporated herein by reference. These spacers can be of any cross-section. The distorted circles shown herein are merely representational, and generally rectangular or square cross-sections are employed. A number of spacer systems are marketed commercially and can be used.

Figure 4:
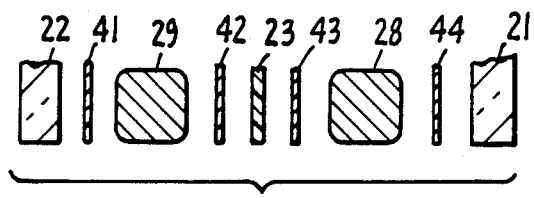
FIG. 4 is an exploded view of the junction among the three panels of the glazing structure at the straight side.

The window structures of this invention can be produced by sandwiching together the various components. As shown in FIG. 4, these components include the two rigid panels 21 and 22, flexible panel 23, spacers 28 and 29, and adhesive layers 41, 42, 43 and 44. All of these adhesives can be contact-type adhesives. Cautions in their selection include (1) avoiding materials which contain large amounts of solvent, once again to avoid outgassing problems, and (2) selecting adhesives which have good long-term lives. We have found that double-sided tape adhesives (available typically from 3 M and Arlon) are convenient to use and we prefer to use adhesive foam tapes for layers 41 and 44 to provide some cushioning and give in the overall assembly.

In one mode of production, the windows are assembled by beginning with the outer (larger radius) rigid pane 22. This is affixed to outer spacer 29 with double-sided contact adhesive foam tape 41. Then a layer of double-sided adhesive tape 42 is applied to the "inner" edge of spacer 29, and this glue layer is pressed onto flexible sheet 23 so as to contact only the curved edges. This is generally carried out with sheet 23 held in a jig to assure correct registration with the glue layer. Then an additional spacer 28 is attached using glue layer 43 again with only the curved sides being glued. Finally inner pane 21 is attached with contact cement-covered foam 44. After these various components are assembled into the structure, the outer surface of the window structure can be sealed. This sealant is shown in FIG. 2 as 35. This sealant should be a high-modulus, low-creep, low-moisture-vapor-transmitting sealant. It should have good adhesion to all of the materials of construction (i.e., metal or plastic, glass, metalized center film, and the like). We have found that polyurethane adhesives, such as the two-component polyurethane marketed by Bostik, are very suitable. Following application, the sealant is allowed to pre-cure. Then the window units are subjected to a heat treatment. Typically temperatures in the range of 160°–250° F., and in particular from about 180° F. to about 225° F., and especially about 215° F., are used. The heating period is from about 1 hour to about 5 hours, with the longer times being required at lower temperatures and the shorter times at higher temperatures. Two hours at 210°–220° F. give good results. This heat treatment serves to cure the adhesives and the outer sealant and build adhesion among the various layers. Also, when the intermediate layer is a heat-shrinkable plastic, such as the preferred polyesters, this heat treatment can shrink the film to a taut condition.

It will be appreciated, however, that to achieve a good parallel relationship among the three layers, the heat-shrinkable film should shrink preferentially perpendicular to the curved sides to which the film is attached. With 10 mil polyester at 200°–220° F., it is possible to obtain an overall shrinkage in the range of 0.4–0.5% in one direction and a shrinkage of only 0.1–0.2% in the other direction. Such film should be oriented with the high-shrink direction being between the two curved sides.

Figure 6:
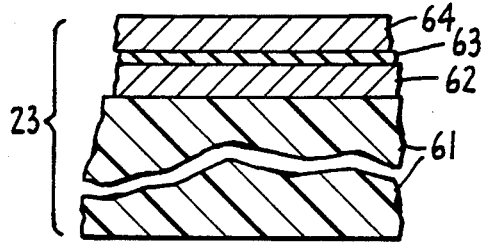
FIG. 6 is a stylized and very expanded-scale view of a preferred heat-reflective plastic film for use within the glazing structures.

In fabricating preferred embodiments of this invention, one can apply a dielectric metal dielectric interference filter or other heat- or light-rejecting layers to the intermediate plastic film. These layers are described in the art. (See the above-noted Fan et al. patent, for example.) They can be designed to transmit from about 40% to about 90% of the visual light impacting them. In our most preferred product, we use a dielectric/metal/dielectric multilayer interference filter. As shown in FIG. 6, a plastic film 61 can be coated with dielectric 62, metal 63 and dielectric 64. Layers 62, 63 and 64 are much thinner than represented in FIG. 6—being on the order of angstroms in thickness. These layers can be laid down by magnetron sputtering techniques which are known to the art. Southwall markets a range of heat reflective film products under its HEAT MIRROR trademark. These materials have various thicknesses of metal (often silver) and dielectric designed to give substantial heat reflection and transmit from 44 to 88% of total visible light. Generally, films transmitting 55–70% of total visible light give pleasing results.

The intermediate plastic film can also be treated in various other art-known ways to improve its performance. For example, it can be subjected to corona discharge before or after application of reflective layers so as to improve adhesive adhesion. This corona treatment can be especially advantageous when the intermediate plastic sheet has been slip-treated for handling ease. Typical corona treatments are carried out to obtain surface energies on the film above about 60 dynes/cm².

Other art-known features can be incorporated. For example, the space between the rigid and flexible sheets can be filled with an inert gas to improve performance. Similarly, the spacers can be hollow and contain desiccant to prevent build up of moisture between the layers. In another configuration, the interior spaces can be vented to the atmosphere, if desired.

While the invention has been described with reference being made to certain preferred embodiments, it will be appreciated that the invention can be modified in many ways, as will be apparent to those of skill in the art without departing from the spirit of the invention, which is as defined by the following claims.

We claim as our invention:

1. A curved insulated glazing structure comprising
    a first rigid glazing panel having a perimeter defined by two opposite parallel curved edges and two opposite parallel straight edges,
    an intermediate flexible plastic glazing panel at least about 5 mils in thickness, similar in size, shape and perimeter to, and spaced from and parallel to, the first rigid glazing panel, and
    a second rigid glazing panel similar in size, shape and perimeter to, and spaced from and parallel to, the first rigid glazing panel and the intermediate flexible glazing panel, with
    the first and second rigid panels being joined to one another in their spaced parallel relationship on substantially their entire perimeter with the flexible panel being joined into the structure only on its parallel curved edges and being substantially free from attachment into the structure on its parallel straight edges.

2. The glazing structure of claim 1 wherein the first and second rigid panels are glass sheets.

3. The glazing structure of claim 1 wherein the flexible panel is a plastic panel.

4. The glazing structure of claim 3 wherein the plastic panel is a 5 to 25 mil thick plastic sheet.

5. The glazing structure of claim 4 wherein the plastic panel is unidirectionally heat shrunk in the direction parallel to the two parallel straight edges.

6. The glazing structure of claim 5 wherein the plastic panel is polyester.

7. The glazing structure of claim 1 wherein the flexible panel carries a heat-reflective coating.

8. The glazing structure of claim 7 wherein the heat-reflective coating is a dielectric/metal/dielectric interference filter.

9. The glazing structure of claim 3 wherein the flexible panel carries a heat-reflective coating.

10. The glazing structure of claim 9 wherein the heat-reflective coating is a dielectric/metal/dielectric interference filter.

11. The glazing structure of claim 4 wherein the flexible panel carries a heat-reflective coating.

12. The glazing structure of claim 11 wherein the heat-reflective coating is a dielectric/metal/dielectric interference filter.

13. A curved insulated triple-pane glazing structure comprising
    a first curved glass panel having a perimeter defined by two opposite parallel curved edges and two opposite parallel straight edges,
    an intermediate flexible polyester panel, said polyester panel being similar in size, shape and perimeter to, spaced from, and parallel to the first curved glass panel, said flexible panel being 5 to 15 mils in thickness, and comprising a dielectric/metal/dielectric heat-reflective filter on one of its surfaces,
    a second curved glass panel similar in size, shape and perimeter to, spaced from, and parallel to the first curved glass panel,
    the first and second rigid panels being joined to one another in their spaced parallel relationship on substantially their entire perimeter, with the flexible panel being joined into the structure only on its parallel curved edges.

14. The glazing structure of claim 13 wherein the polyester panel is unidirectionally heat shrunk in the direction parallel to the two parallel straight edges.

15. A method for producing a curved triple-pane glazing structure comprising assembling an inner curved glass pane, an intermediate curved plastic sheet and an outer curved glass pane in parallel spaced relationship, the two glass panes being joined on substantially their entire perimeter and the plastic sheet being attached only on its curved sides and being free on its straight sides, the plastic sheet being 5 to 25 mils in thickness and being preferentially heat shrinkable in the direction parallel to the straight sides and heating the assembled panel for a time and temperature adequate to preferentially heat shrink the intermediate plastic sheet.

* * * * *